US008411070B2

(12) United States Patent
Boer et al.

(10) Patent No.: US 8,411,070 B2
(45) Date of Patent: *Apr. 2, 2013

(54) INFRARED SENSOR INTEGRATED IN A TOUCH PANEL

(75) Inventors: Willem den Boer, Hillsboro, OR (US); Steven N. Bathiche, Kirkland, WA (US); Stephen Edward Hodges, Cambridge (GB); Shahram Izadi, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/046,481

(22) Filed: Mar. 11, 2011

(65) Prior Publication Data

US 2011/0169779 A1    Jul. 14, 2011

Related U.S. Application Data

(63) Continuation of application No. 11/604,491, filed on Nov. 27, 2006, now Pat. No. 7,924,272.

(51) Int. Cl.
*G06F 3/042*    (2006.01)
(52) U.S. Cl. ........ 345/175; 345/173; 345/207; 345/211; 178/18.09
(58) Field of Classification Search .......... 345/156–158, 345/173, 175, 176, 76, 211, 207; 715/702, 715/740; 178/18.01–19.04; 434/322–364; 315/149–150; 713/300–320, 323–340
See application file for complete search history.

(56) References Cited

U.S. PATENT DOCUMENTS

| | | | |
|---|---|---|---|
| 4,710,760 A | 12/1987 | Kasday | |
| 4,782,328 A | 11/1988 | Denlinger | |
| 5,007,085 A | 4/1991 | Greanias et al. | |
| 5,442,376 A | 8/1995 | Tannenbaum et al. | |
| 5,543,591 A | 8/1996 | Gillespie et al. | |
| 5,584,552 A | 12/1996 | Nam-Su et al. | |
| 5,594,810 A | 1/1997 | Gourdol | |
| 5,615,003 A | 3/1997 | Hermary et al. | |
| 5,729,251 A | 3/1998 | Nakashima | |
| 5,764,223 A | 6/1998 | Chang et al. | |
| 5,784,060 A | 7/1998 | Bertram et al. | |
| 5,825,352 A | 10/1998 | Bisset et al. | |
| 5,835,078 A | 11/1998 | Arita et al. | |
| 5,929,432 A * | 7/1999 | Yamakawa | 250/208.1 |
| 5,986,745 A | 11/1999 | Hermary et al. | |
| 6,002,387 A | 12/1999 | Ronkka et al. | |
| 6,023,265 A | 2/2000 | Lee | |

(Continued)

FOREIGN PATENT DOCUMENTS

GB    2315594    2/1998
KR    20030028973    4/2003

(Continued)

OTHER PUBLICATIONS

Abileah et al., "Integrated Optical Touch Panel in a 14.1 AMLCD", Date: May 2003, vol. 35, Issue: 1, p. 1544-1547, http://scitation.aip.org/getabs/servlet/GetabsServlet?

(Continued)

*Primary Examiner* — Lun-Yi Lao
*Assistant Examiner* — Kelly B Hegarty

(57) ABSTRACT

An infrared source is configured to illuminate the underside of one or more objects on or above a touchable surface of a touch panel. Infrared light reflected from the underside of the object(s) is detected by an infrared sensor integrated in the touch panel below the touchable surface.

22 Claims, 14 Drawing Sheets

U.S. PATENT DOCUMENTS

| | | | |
|---|---|---|---|
| 6,229,529 | B1 | 5/2001 | Yano et al. |
| 6,324,310 | B1 | 11/2001 | Brownlee |
| 6,538,644 | B1 | 3/2003 | Muraoka |
| 6,747,290 | B2 | 6/2004 | Yamazaki et al. |
| 6,856,259 | B1 | 2/2005 | Sharp |
| 6,879,319 | B2 | 4/2005 | Cok |
| 6,888,536 | B2 | 5/2005 | Westerman et al. |
| 6,995,743 | B2 | 2/2006 | Boer et al. |
| 6,995,752 | B2 | 2/2006 | Lu |
| 7,009,663 | B2 | 3/2006 | Abileah et al. |
| 7,050,048 | B2 | 5/2006 | Ito |
| 7,053,967 | B2 | 5/2006 | Abileah et al. |
| 7,158,118 | B2 | 1/2007 | Liberty |
| 7,173,604 | B2 | 2/2007 | Marvit et al. |
| 7,272,255 | B2 | 9/2007 | Ishiyama |
| 7,360,708 | B2 | 4/2008 | Miyake et al. |
| 7,365,736 | B2 | 4/2008 | Marvit et al. |
| 7,548,230 | B2 | 6/2009 | Corson |
| 7,584,432 | B1 | 9/2009 | Oakley et al. |
| 7,646,379 | B1 | 1/2010 | Drennan et al. |
| 7,764,274 | B2 | 7/2010 | Westerman et al. |
| 7,924,272 | B2 | 4/2011 | Boer et al. |
| 7,932,913 | B2 | 4/2011 | Ishiyama |
| 8,094,129 | B2 | 1/2012 | Izadi et al. |
| 8,269,746 | B2 | 9/2012 | Hodges et al. |
| 2002/0050983 | A1 | 5/2002 | Liu et al. |
| 2003/0081156 | A1* | 5/2003 | Creemers et al. ............. 349/106 |
| 2003/0103030 | A1 | 6/2003 | Wu |
| 2003/0107748 | A1 | 6/2003 | Lee |
| 2003/0137494 | A1 | 7/2003 | Tulbert |
| 2004/0090582 | A1* | 5/2004 | Ikeda et al. .................. 349/130 |
| 2004/0147200 | A1* | 7/2004 | Urabe et al. .................... 445/24 |
| 2004/0263482 | A1 | 12/2004 | Goertz |
| 2005/0110964 | A1 | 5/2005 | Bell et al. |
| 2005/0122308 | A1 | 6/2005 | Bell et al. |
| 2005/0133690 | A1* | 6/2005 | Higashitsutsumi ......... 250/208.1 |
| 2005/0134751 | A1* | 6/2005 | Abileah et al. ................... 349/42 |
| 2005/0162381 | A1 | 7/2005 | Bell et al. |
| 2005/0200293 | A1* | 9/2005 | Naugler et al. ............... 315/149 |
| 2005/0219204 | A1 | 10/2005 | Huddleston et al. |
| 2005/0225546 | A1* | 10/2005 | Akimoto ....................... 345/207 |
| 2005/0226505 | A1 | 10/2005 | Wilson |
| 2005/0230609 | A1 | 10/2005 | Randall |
| 2005/0236481 | A1 | 10/2005 | Gascoyne et al. |
| 2005/0259266 | A1 | 11/2005 | Seko |
| 2006/0007248 | A1 | 1/2006 | Reddy et al. |
| 2006/0103799 | A1* | 5/2006 | Ikeda et al. ................... 349/124 |
| 2006/0145365 | A1 | 7/2006 | Halls et al. |
| 2006/0146038 | A1 | 7/2006 | Park et al. |
| 2006/0158599 | A1* | 7/2006 | Koo ............................... 349/155 |
| 2006/0227120 | A1 | 10/2006 | Eikman |
| 2006/0244693 | A1* | 11/2006 | Yamaguchi et al. ............. 345/76 |
| 2006/0279690 | A1* | 12/2006 | Yu et al. ........................ 349/199 |
| 2006/0284857 | A1 | 12/2006 | Oh |
| 2007/0113207 | A1 | 5/2007 | Gritton |
| 2007/0126973 | A1* | 6/2007 | Ikeda et al. ................... 349/155 |
| 2007/0177085 | A1* | 8/2007 | Nishiyama et al. ........... 349/117 |
| 2007/0273670 | A1 | 11/2007 | Nordahl |
| 2008/0121442 | A1 | 5/2008 | Boer et al. |
| 2008/0122792 | A1 | 5/2008 | Izadi et al. |
| 2008/0122803 | A1 | 5/2008 | Izadi et al. |
| 2008/0150890 | A1 | 6/2008 | Bell et al. |
| 2008/0150913 | A1* | 6/2008 | Bell et al. ....................... 345/175 |
| 2008/0198138 | A1 | 8/2008 | McFarlane et al. |
| 2009/0021488 | A1 | 1/2009 | Kali et al. |
| 2010/0177060 | A1 | 7/2010 | Han |
| 2011/0157094 | A1 | 6/2011 | Boer et al. |
| 2012/0075256 | A1 | 3/2012 | Izadi et al. |

FOREIGN PATENT DOCUMENTS

| | | |
|---|---|---|
| KR | 20050073631 | 7/2005 |

OTHER PUBLICATIONS

Albinsson et al., "High Precision Touch Screen Interaction", Date: 2003, p. 105-112, http://delivery.acm.org/10.1145/650000/642631/p105-albinsson.pdf?key1=642631&key2=2760516511&coll=portal&dl=GUIDE&CFID=547568&CFTOKEN=88.

Boer et al., "Active Matrix LCD with Integrated Optical Touch Screen", Date: 2003, http://www.planar.com/advantages/WhitePapers/docs/Planar-AMLCD-Optical-Touchscreen.pdf#search=%22%22Active%20Matrix%20LCD%20with%20INtegrated%.

Jefferson Y. Han, "Low-Cost Multi-Touch Sensing through Frustrated Total Internal Reflection", Date: 2005, p. 115-118, http://delivery.acm.org/10.1145/1100000/1095054/p115-han.pdf?

Steve Klink, Philips Research Press Release, Jan. 4, 2006, http://www.research.philips.com/newscenter/archive/2006/060104-entert.

"Fastcompany.com", retrieved on Mar. 23, 2007, at <<http://fastcompany.com/video/general/perceptivepixel.html>>, Mansueto Ventures LLC., 2007, pp. 1.

Han, "Multi-Touch Interaction Research", retrieved on Mar. 3, 2007, at <<http://cs.nyu.edu/~jhan/ftirtouch/index.html>>, Jeff Han, 2006, pp. 4.

Hinckley, et al., "Touch-Sensing Input Devices", available at least as early as Mar. 12, 2007, at <<http://www.cs.ubc.ca/labs/spin/publications/related/hinckley99.pdf>>, ACM, 1999, pp. 223-230.

Marino, et al., "Programming for Multiple Touches and Multiple Users: A Toolkit for the DiamondTouch Hardware", available at least as Mar. 12, 2007, at <<http://grouplab.cpsc.ucalgary.ca/papers/2003/03-DiamondTouch.UISTDemo/03-DiamondTouch-UISTDemo.pdf>>, ACM, 2003, pp. 2.

"Multi-Touch Sensing through Frustrated Total Internal Reflection", retrieved on Mar. 3, 2007 at <<http://cs.nyu.edu/~jhan/ftirsense/index.html>>, ACM, 2005, pp. 2.

"Multi-Touch Sensing through LED Matrix Displays", retrieved on Mar. 3, 2007 at <<http://cs.nyu.edu/~jhanlledtouch/index.html>>, pp. 1.

Paradiso, "Several Sensor approaches that Retrofit Large Surfaces for Interactivity", ACM, 2002, pp. 8.

Rekimoto, "SmartSkin: An Infrastructure for Freehand Manipulation on Interactive Surfaces", available at least as early as Mar. 12, 2007, at <<http://delivery.acm.org/10.1145/510000/503397/p113-rekimoto.pdf?key1=503397&key2=5112863711&coll=GUIDE&dl=GUIDE&CFID=13417221&CFTOKEN=15136912>>, ACM, vol. 4 No. 1, 2002, pp. 113-120.

"Touch Panel", retrieved on Mar. 3, 2007, at <<7.http://en.wikipedia.org/wiki/Touch_panel>>Wikimedia Foundation,Inc., 2007, pp. 2.

Written Opinion of the International Searching Authority and International Search Report issued by the Korean Intellectual Property Office for International Application No. PCT/US2008/058803 dated Aug. 8, 2008.

Written Opinion of the International Searching Authority and International Search Report issued by the Korean Intellectual Property Office for International Application No. PCT/US2008/058805 dated Aug. 11, 2008.

Office Action from the USPTO regarding U.S. Appl. No. 13/046,618 dated Sep. 4, 2012.

Han, "Low-Cost Multi-Touch Sensing through Frustrated Total Internal Reflection," UIST'05, pp. 115-118, Oct. 23-27, 2005, Seattle, WA, accessible at 21 <http://delivery.acm.org/10.1145/1100000/1096054/p115-han.pdf?>>.

Matsushita et al., "HoloWall: Designing a Finger, Hand, Body, and Object Sensitive Wall," UIST'97, Oct. 1997, Banff, Alberta, Canada, pp. 209-210.

Office Action from the USPTO regarding U.S. Appl. No. 11/604,491 dated Feb. 17, 2010.

Office Action from the USPTO regarding U.S. Appl. No. 11/604,491 dated Sep. 3, 2010.

Office Action from the USPTO regarding U.S. Appl. No. 13/046,618 dated Feb. 6, 2012.

Office Action from the USPTO regarding U.S. Appl. No. 11/693,683 dated Feb. 23, 2010.

Office Action from the USPTO regarding U.S. Appl. No. 11/693,683 dated Aug. 3, 2010.

Office Action from the USPTO regarding U.S. Appl. No. 11/693,683 dated Dec. 8, 2010.

Office Action from the USPTO regarding U.S. Appl. No. 11/693,683 dated Jun. 23, 2011.

Office Action from the USPTO regarding U.S. Appl. No. 13/313,700 dated Apr. 27, 2012.

Office Action from the USPTO regarding U.S. Appl. No. 11/693,670 dated Feb. 17, 2010.
Office Action from the USPTO regarding U.S. Appl. No. 11/693,670 dated Jul. 16, 2010.
Office Action from the USPTO regarding U.S. Appl. No. 11/693,670 dated Nov. 29, 2010.
Office Action from the USPTO regarding U.S. Appl. No. 11/693,670 dated Jun. 23, 2011.
Office Action from the USPTO regarding U.S. Appl. No. 11/693,670 dated Nov. 10, 2011.

* cited by examiner

INFRARED SENSOR INTEGRATED IN A TOUCH PANEL

CROSS-REFERENCE TO RELATED APPLICATIONS

This patent application is a continuation of U.S. patent application Ser. No. 11/604,491 titled "INFRARED SENSOR INTEGRATED IN A TOUCH PANEL" which was filed on Nov. 27, 2006 and issued on Apr. 12, 2011 as U.S. Pat. No. 7,924,272, and which is expressly incorporated herein by reference.

BACKGROUND

Systems having optical sensor arrays directly incorporated into a thin film transistor (TFT) liquid crystal display (LCD) have been proposed. Many different uses for such systems exist, for example, as a scanner, fingerprint sensor or touch screen. Such a system has two images: the image displayed on the LCD display screen and the image detected by the optical sensor array. Light from the display itself may add noise or ambiguity to the image detected by the optical sensor array, if the optical sensor array detects visible light in the same wavelengths as that emitted by the display In a shadow mode of operation, the sensor array may sense one or more objects such as a finger on or above the display screen by detecting the shadow of the ambient light cast by the object. The image from the sensor array is then processed to obtain the X,Y coordinates of the object(s). A sensor array used in shadow detection may require a very high dynamic range in order to detect shadows in ambient lighting the illuminance of which can vary over many orders of magnitude. If the ambient lighting is too dark, there is no shadow, and the method fails completely. Moreover, shadow detection is unable to detect patterns, designs, and other details on the object surface that is in shadow.

In a reflective mode of operation, a controlled light source is used to illuminate one or more objects such as a finger on or above the display screen. The backlight is a controlled light source, and by turning all pixels on in a color LCD, a uniform white light is transmitted through the display. The reflection of this light from the object(s) may be detected by the optical sensor array and processed. However, if the LCD is displaying a black image, then the backlight is not illuminating anything in the region above the image and any objects in that region will not be detected. An arbitrary image displayed on the LCD will affect how much of the backlight is transmitted through the LCD and therefore the illumination of objects on or above the display screen. Consequently, in reflective mode, an arbitrary image on the display screen may interfere with the detection of objects on or above the display screen.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An infrared source illuminates the underside of one or more objects on or above a touchable surface of a touch panel system. Infrared light reflected from the underside of the object(s) is detected by an infrared sensor integrated in the touch panel. The output of several of such infrared sensors may be processed to identify a detected infrared image. The infrared sensors may be distributed throughout the touch panel, in parallel to the touchable surface. Since the image to be detected is sensed in the infrared portion of the spectrum, it does not conflict with any image displayed in the visible portion of the spectrum on a display incorporated into the touch panel.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments of the described technology. However it will be understood by those of ordinary skill in the art that the embodiments may be practiced without these specific details. In other instances, well-known methods, procedures and components have not been described in detail so as not to obscure the embodiments of the described technology.

Figure 1:
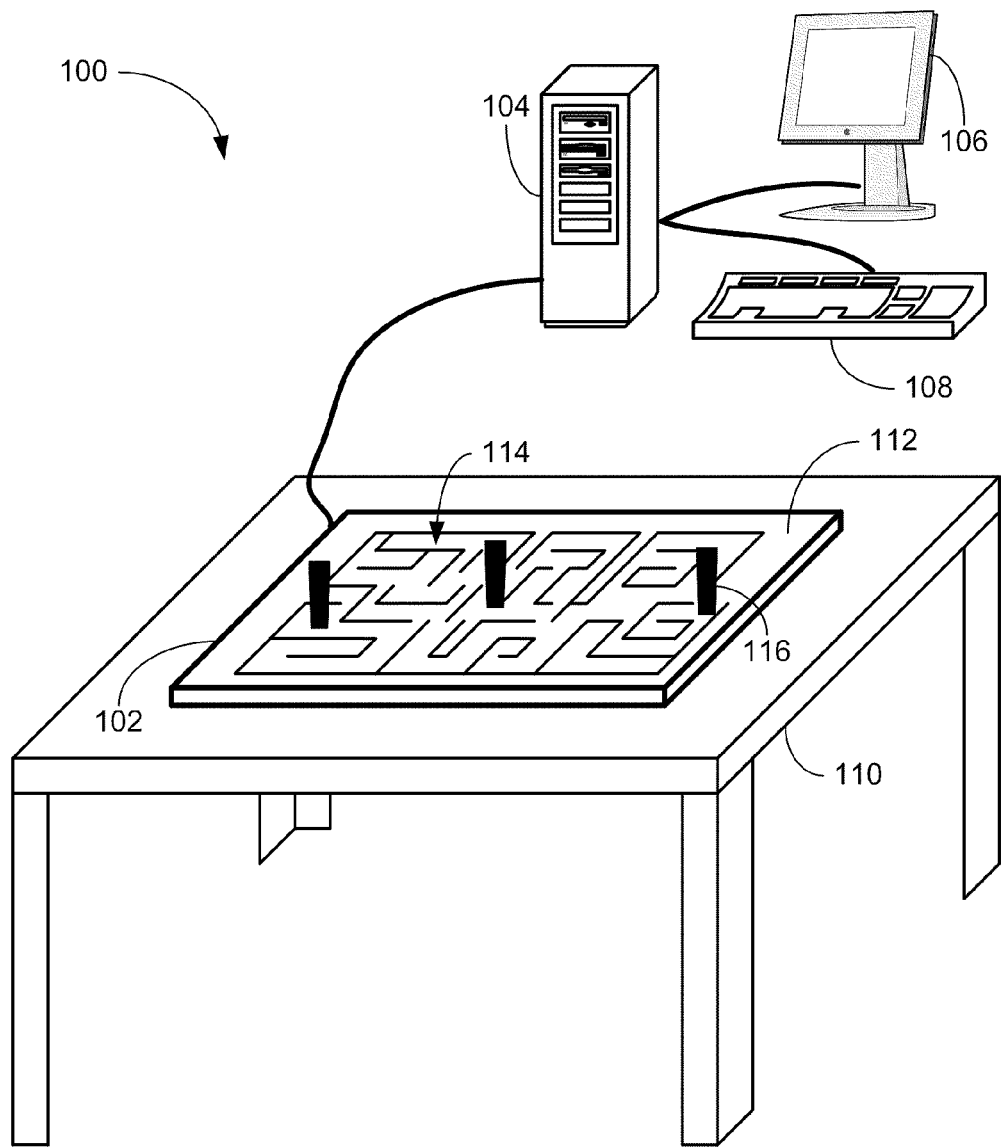
FIG. 1 illustrates an exemplary interactive display system incorporating a touch panel system.

A touch panel system according to the described technology may have many different applications. For example, touch panels that have display capabilities may be used for interactive display. FIG. 1 illustrates an exemplary interactive display system incorporating a touch panel system. An interactive display system 100 comprises a touch panel system 102 coupled to a computer 104. Computer 104 may be controlled via a monitor 106 and a keyboard 108 or any other suitable user interface. Touch panel system 102 is thin and is generally placed on a flat surface, such as the top of a table 110 or hanging from a wall. Touch panel system 102 comprises a touch panel and has a touchable surface 112. The touch panel is also a display, and a graphic image 114 displayed by the display is viewable via touchable surface 112. In the example shown in FIG. 1, the graphic image 114 is that of a maze. Computer 104 provides processing power that yields a rich user interactive experience. As players move physical game pieces 116 around the maze, touch panel system 102 is able to detect the location of the game pieces, and to alter the displayed graphic image accordingly. For example, the walls of the maze may be moved to increase the complexity of the game, or a video clip may be shown if a game piece is placed on a certain location in the maze.

Infrared (IR) sources in system 102 illuminate the physical game pieces 116. IR radiation reflected from game pieces 116 is detected by IR sensors that are integrated into the touch panel. Signals from the IR sensors are processed by computer 104 to identify the locations of physical game pieces 116 on touchable surface 112. Any suitable method for distinguishing between different game pieces 116 on touchable surface 112 may be used. For example, physical game pieces 116 may have distinct shapes or may have symbols such as bar codes imprinted on their undersides. Since infrared radiation is used to detect the locations of physical game pieces, graphic image 114 does not affect the detection. Similarly, ambient visible light or lack thereof does not affect the detection.

Figure 2A:
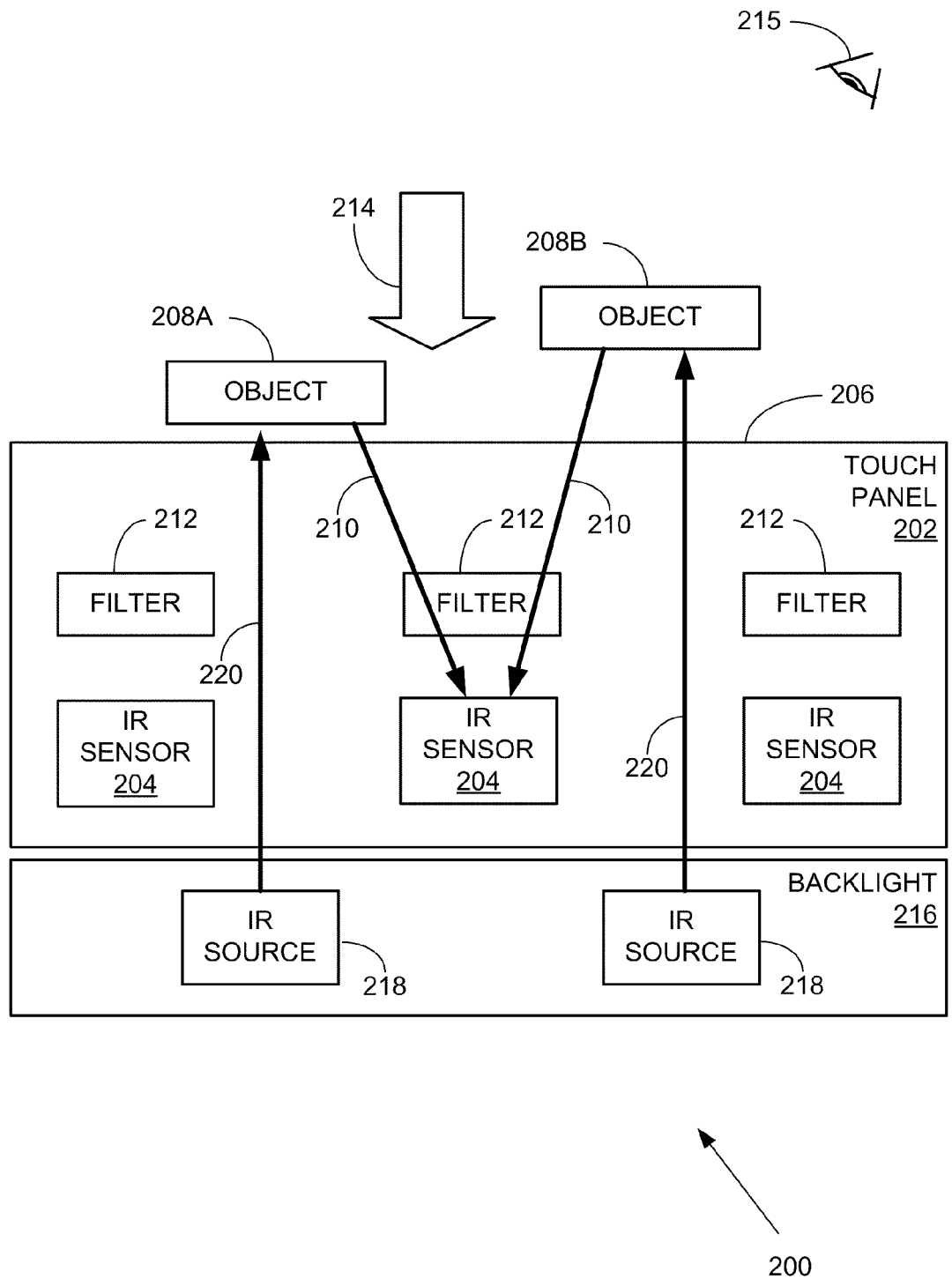
FIGS. 2A, 2B and 2C illustrate cross-sections of exemplary touch panel systems.

FIG. 2A illustrates a cross-section of an exemplary touch panel system. A touch panel system 200 comprises a touch panel 202 that has several infrared (IR) sensors 204 integrated therein. Objects above a touchable surface 206 include an object 208A that is in contact with touchable surface 206 and an object 208B that is close to but not in actual contact with ("adjacent") touchable surface 206. Infrared sensors 204 are distributed throughout touch panel 202 parallel to touchable surface 206. One of infrared sensors 204 may detect infrared radiation reflected from objects 208A and 208B, as indicated by arrows 210. Although the term "above" is used in this description, it should be understood that the orientation of the touch panel system is irrelevant. As shown in FIG. 2, touchable surface 206 is horizontal, but in a different embodiment generated by rotating system 200 clockwise by 90 degrees, touchable surface 206 could be horizontal. In that embodiment, the objects from which reflected IR radiation is detected are to the side of touchable surface 206. The term "above" is intended to be applicable to all such orientations.

Touch panel 202 may comprise filters 212 that absorbs visible light and transmits infrared radiation and are located between touchable surface 206 and IR sensors 204 in order to shield IR sensors 204 from visible light 214 incident on touchable surface 206 in the case where IR sensors 204 are sensitive to a broader range of wavelengths of light other than purely infrared wavelengths.

Touch panel 202 may comprise a display that is configured to display images that are viewable via touchable surface 206. An eye 215 indicates a possible direction from which the images are viewed. The display may be, for example, an LCD, an organic light emitting diode (OLED) display, a flexible display such as electronic paper, or any other suitable display in which an IR sensor can be integrated.

System 200 may comprise a backlight 216 for the display. Backlight 216 may comprise at least one IR source 218 that is configured to illuminate objects in contact with or adjacent touchable surface 206 with infrared radiation through touchable surface 206, as indicated by arrows 220. IR sensor 204s are only sensitive to radiation incident from above, so IR radiation traveling directly from backlight 216 to IR sensor 204s is not detected.

The output of IR sensors 204 may be processed to identify a detected infrared image. The IR radiation reflected from the objects may be reflected from reflective ink patterns on the objects, metal designs on the objects or any other suitable reflector. For example, white paper reflects IR radiation and black ink absorbs IR radiation, so a conventional bar code on a surface of an object may be detected by an infrared-sensing device according to the described technology. Fingers are estimated to reflect about 10% of the near IR, which is sufficient to detect that a finger or hand is located at a particular location on or adjacent the touchable surface. A higher resolution of IR sensors may be used to scan objects to do applications such as document scanning and fingerprint recognition. For example, fingerprint recognition generally requires a resolution of more than 200 dots per inch (dpi).

Figure 2B:
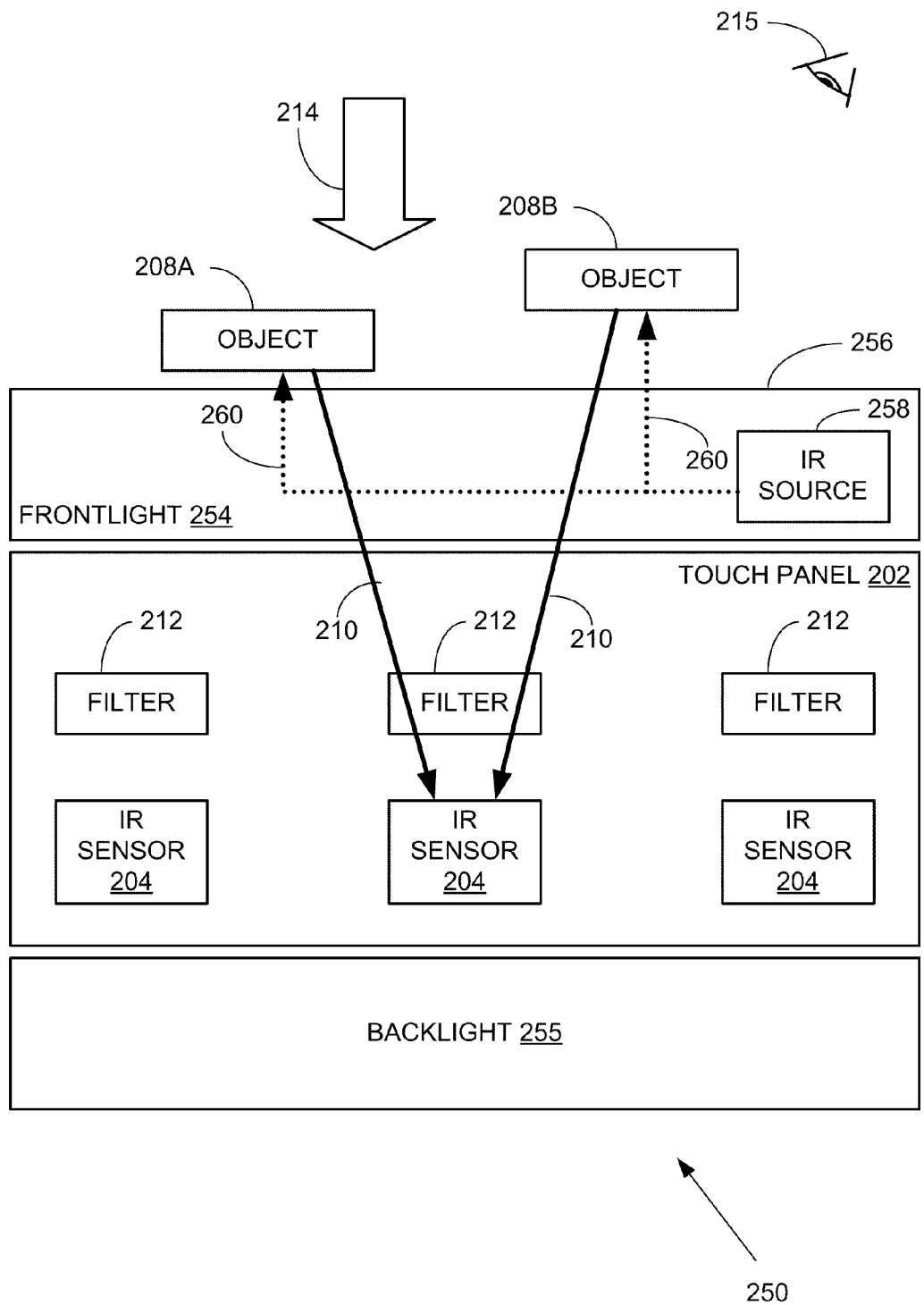

FIG. 2B illustrates a cross section of another exemplary touch panel system. A touch panel system 250 comprises touch panel 202 having several IR sensors 204 integrated therein, a frontlight 254 and a backlight 255. Backlight 255 does not comprise any IR sources, whereas frontlight 254 comprises at least one IR source 258. Due to the presence of frontlight 254, a touchable surface 256 of system 250 is actually a surface of frontlight 254 and not of touch panel 202. Infrared sensors 204 are distributed throughout touch panel 202 parallel to touchable surface 256. IR source 258 is configured to illuminate objects above touchable surface 256, for example, objects 208A and 208B, with IR radiation through touchable surface 256. Frontlight 254 may comprise a light guide (not shown), so that IR radiation emitted from IR source 258 travels through the light guide and is directed towards touchable surface 256, as indicated by dashed lines 260.

In other touch panel systems, both the backlight and frontlight may comprise IR sources. In yet other touch panel systems, there is no backlight and the frontlight comprises both IR sources and visible light sources.

Figure 2C:
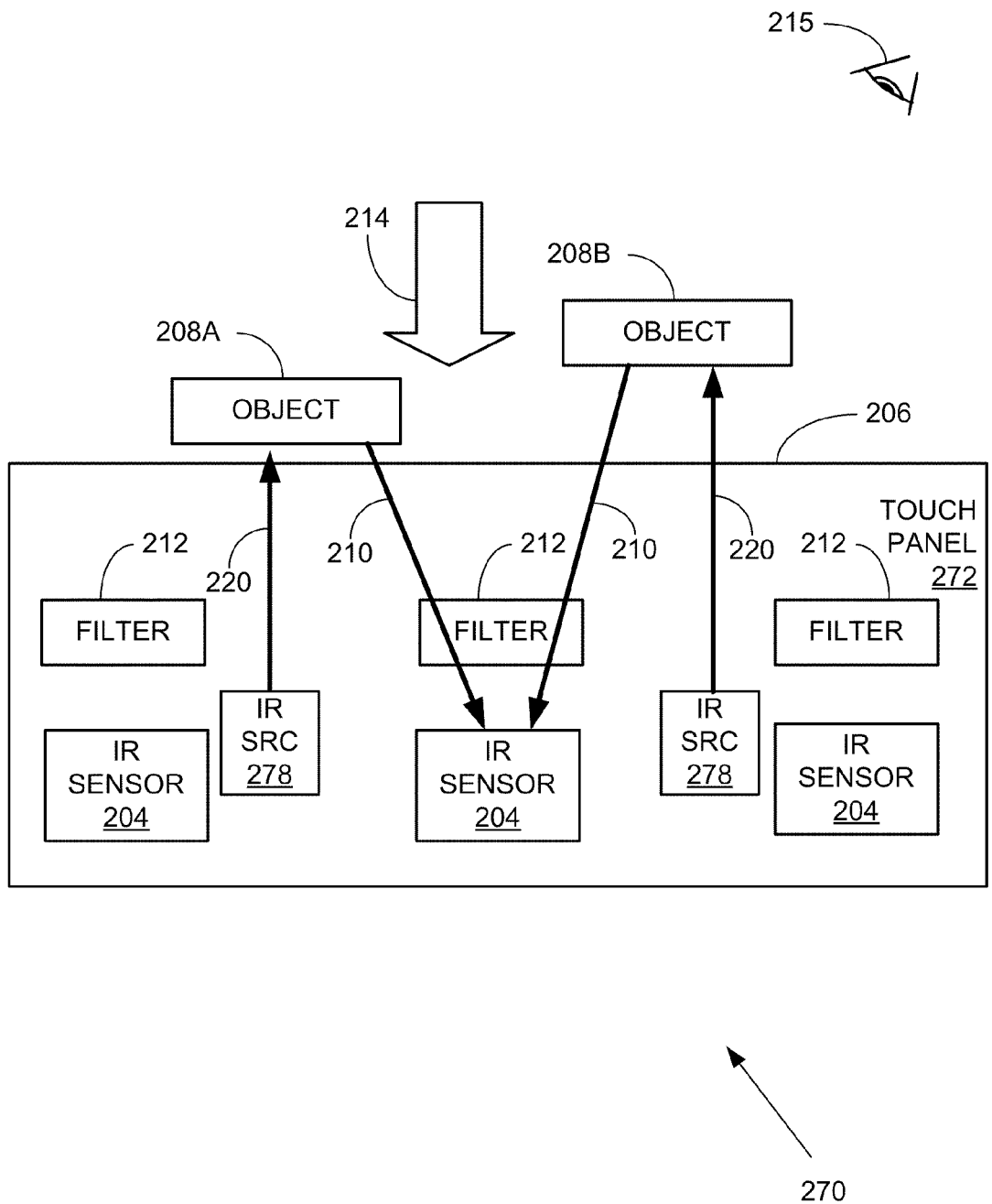

FIG. 2C illustrates a cross section of yet another exemplary touch panel system. A touch panel system 270 comprises a touch panel 272 having IR sensors 204 integrated therein. Touch panel system 270 does not comprise a frontlight or a backlight. Touch panel 272 also has IR sources 278 integrated therein which are configured to illuminate objects above touchable surface 206 with IR radiation through touchable surface 206, as indicated by arrows 220.

Touch panel 272 may comprise a display that is configured to display images that are viewable via a touchable surface 276. Eye 215 indicates a possible direction from which the images are viewed. The display may be any suitable display in which IR sensors and IR sources can be integrated.

For example, touch panel 272 may comprise an OLED display which comprises IR OLED emitters. Near-IR OLED emitters have been demonstrated. Similarly, IR-sensitive organic photosensors are also possible, for example, by using a reverse-biased OLED.

In some touch panel systems, the touch panel may not comprise a display. Even if the touch panel comprises one or more components or elements of a display, the touch panel may be configured as to not display any images. For example, this may be the case when the input tablet is separate from the display. Other examples include a touchpad, a gesture pad, and similar non-display devices and components.

For some applications, it may be desirable to detect an object only if it is in actual contact with the touchable surface of the touch panel system. The IR source of the touch panel system may be turned on only if the touchable surface is touched. Alternatively, the IR source may be turned on regardless of whether the touchable surface is touched, and detection of whether actual contact between the touchable surface and the object occurred is processed along with the output of the IR sensor. Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

IR sensors 204 may comprise suitable infrared-sensitive semiconductor elements. A non-exhaustive list of examples of semiconductor material that is infrared-sensitive includes polycrystalline silicon, monocrystalline silicon, microcrystalline silicon, nanocrystalline silicon, plastic semiconductors and other non-silicon based semiconductors. Devices based on polycrystalline, microcrystalline, monocrystalline or nanocrystalline silicon may have better stability than amorphous silicon devices. TFTs based on polycrystalline, microcrystalline, monocrystalline or nanocrystalline silicon may have higher field mobility than amorphous silicon TFTs.

Figure 3:
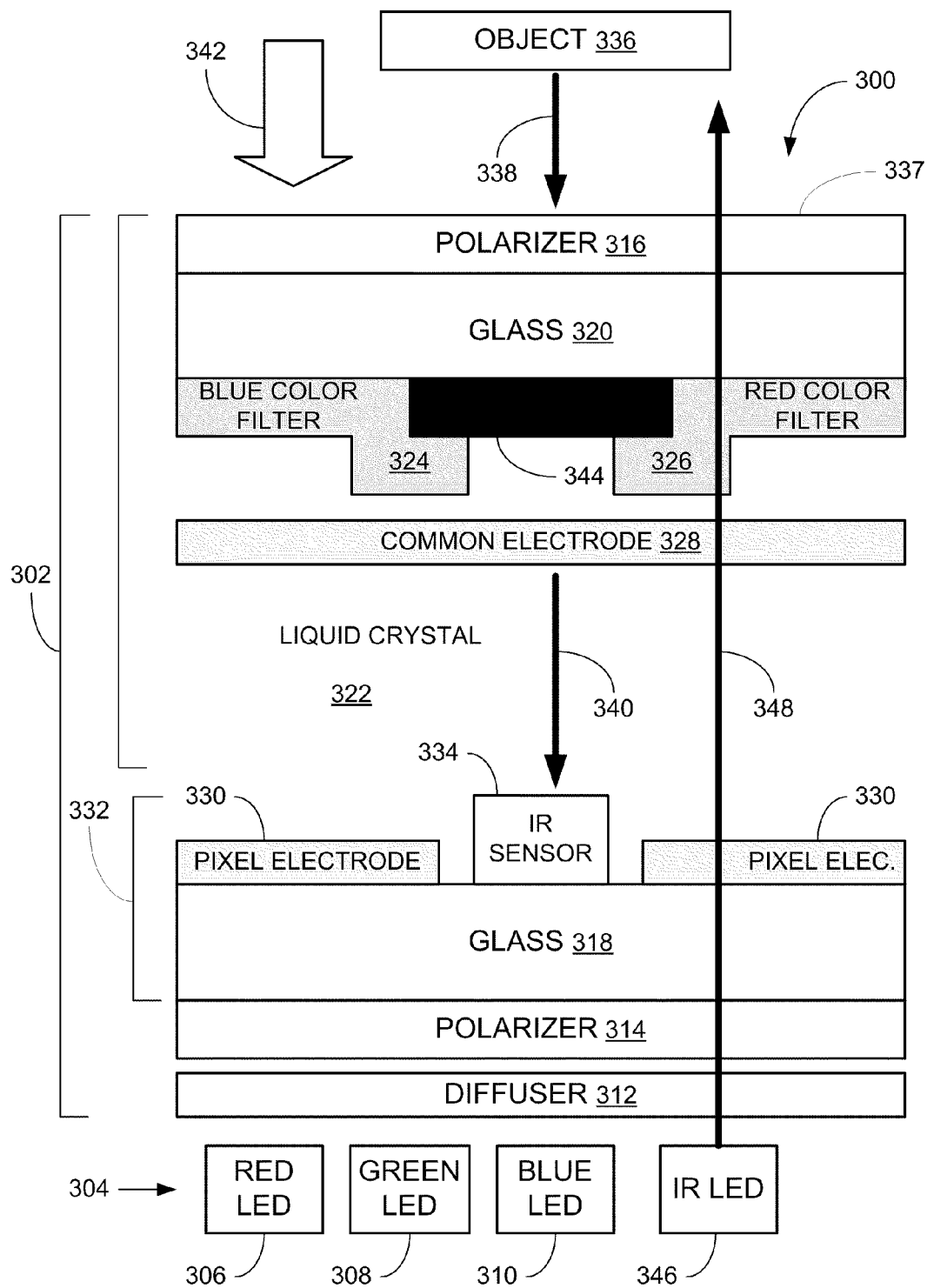
FIG. 3 illustrates a cross-section of an exemplary touch panel system having an exemplary liquid crystal display incorporated therein.

FIG. 3 illustrates a cross-section of an exemplary touch panel system having an exemplary LCD incorporated therein. A touch panel system 300 comprises a liquid crystal display 302 and a backlight 304. Backlight 304 comprises arrays of light-emitting diodes (LEDs). In a color backlight, red LEDs 306, green LEDs 308 and blue LEDs 310 may be used. Liquid crystal display 302 typically comprises a diffuser 312 to disperse the light from backlight 304 and obtain a more uniform intensity over the surface of the display.

LCD 302 comprises a pair of polarizers 314 and 316 separated by a pair of glass substrates 318 and 320, which in turn are separated by a layer of liquid crystal material 322 contained in a cell gap between substrates 318 and 320. In other implementations, substrates 318 and 320 may be constructed from another transparent material, for example, plastic. Color filters, for example, a blue color filter (CF) 324 and a red color filter 326, are adjacent the inner surface of substrate 320. Each color filter transmits only part of the visible spectrum.

In the example shown in FIG. 3, LCD 102 is an active matrix LCD. A continuous electrode 328, termed "common electrode", is located between the color filters and liquid crystal material 322. Electrode 328 is constructed using any suitable transparent electrode material, for example, indium tin oxide (ITO). Individual pixel electrodes 330 may be patterned from any suitable transparent electrode material, for example, ITO, and located on the inner surface of substrate 318.

As is known in the art, each pixel in an LCD is a small capacitor with a layer of insulating liquid crystal between two transparent electrodes. By applying a voltage to the pixel, one can control the intensity of the visible light that is transmitted through LCD 302. In a color LCD, a displayed pixel is formed of a plurality of sub-pixels. Different pixel arrangements are possible and not every pixel necessarily includes sub-pixels of all three primary colors (typically, red, green and blue). For example, pixel arrangements that have on average two sub-pixels per displayed pixel are known. In another example, pixel arrangements that include red, green, blue and white sub-pixels are known. By varying the intensity of transmitted light for each of a plurality of mono-color sub-pixels that make up a displayed pixel, a color image is generated on the surface of LCD display.

In a TFT active matrix LCD, substrate 318 includes TFTs which act as individual switches for each pixel electrode 330 (or group of pixel electrodes) corresponding to a pixel (or a group of pixels). The TFTs are described in further detail below with respect to FIG. 6. Pixel electrodes 330, the TFTs, and substrate 318 form a backplane 332 of LCD 302.

It is known, although not widely, that polarizers and color filters lose their function in the near infrared (IR) region of the spectrum. A sheet polarizer no longer polarizes electromagnetic waves at wavelengths larger than about 800 to 850 nm. Red, green and blue pigment color filters, typically used in LCDs, also transmit most of the wavelengths in the near infrared region of the spectrum. Hence, some near infrared light is transmitted through a conventional LCD, independent of the image displayed on the LCD display screen. For example, 40% of the near infrared light incident on one surface (front or back) of a conventional LCD may be transmitted through the LCD. The precise percentage of near infrared light transmitted through a particular LCD may depend on several factors, including, for example, the pixel aperture ratio and internal reflections in the cell.

LCD 302 comprises an IR sensor 334 integrated therein. As shown in FIG. 3, IR sensor 334 is integrated into backplane 332. Any IR light reflected from an object 336 in contact with or adjacent a touchable surface 337 of LCD 302 will be transmitted through polarizer 316, substrate 320, common electrode 328, liquid crystal material 322 and detected by IR sensor 334. An arrow 338 indicates the IR light reflected from object 336 and an arrow 340 indicates the IR light in liquid crystal material 322, the IR light possibly attenuated by polarizer 316, substrate 320, and common electrode 328.

IR sensor 334 may include, for example, a polycrystalline silicon TFT or photodiodes, a monocrystalline silicon TFT or photodiode, a microcrystalline silicon TFT or photodiode, or a nanocrystalline silicon TFT or photodiode. Infrared-sensitive semiconductor materials that are not based in silicon are also contemplated for elements of IR sensor 334.

Figure 4:
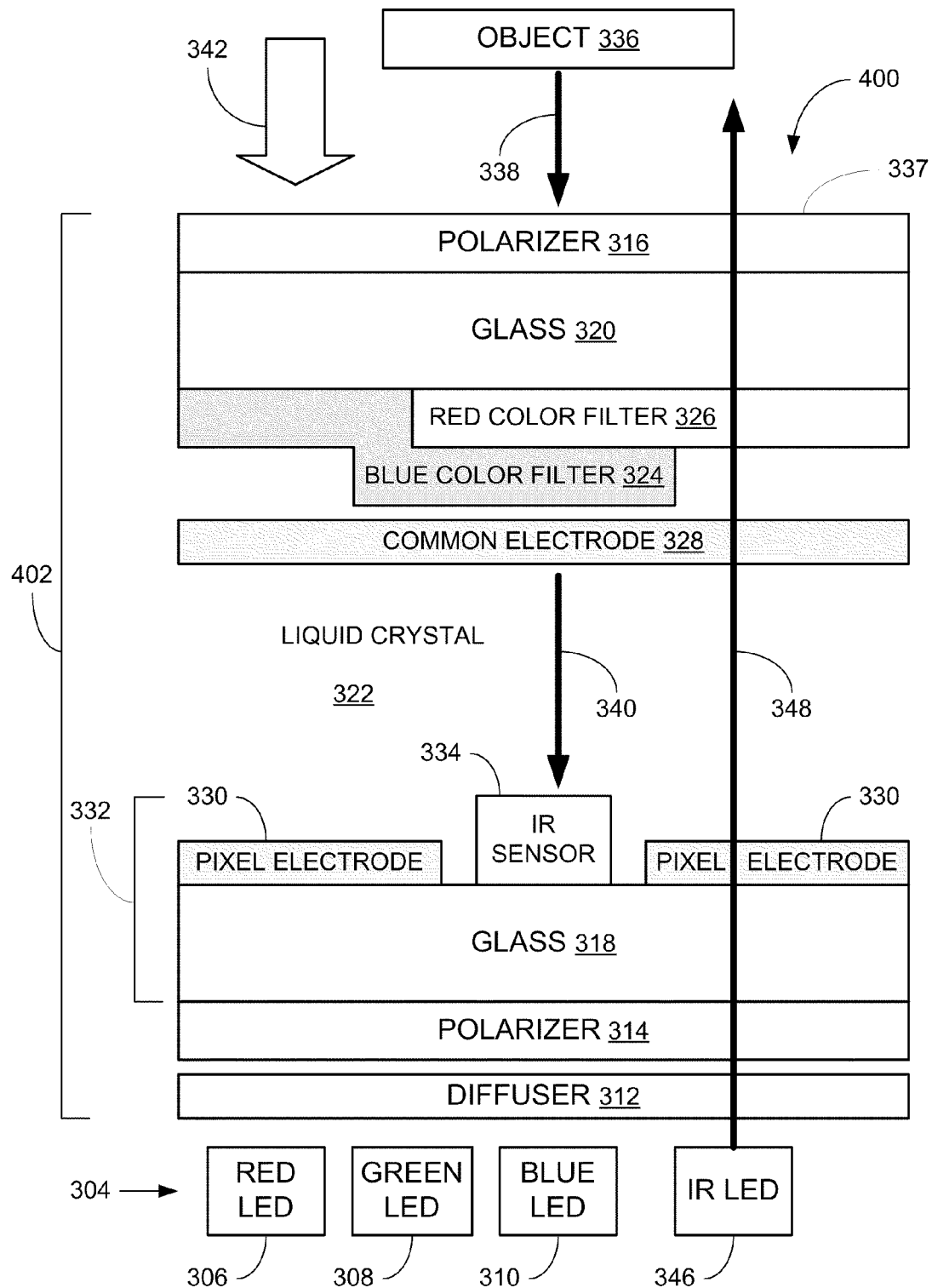
FIG. 4 illustrates a cross-section of an exemplary touch panel system having another exemplary liquid crystal display incorporated therein.

In order to block visible light from reaching IR sensor 334, an IR-transmitting and visible-light absorbing filter may be integrated in LCD 302 opposite IR sensor 334. If such a filter is integrated in LCD 302, the susceptibility of the IR sensor to noise from ambient lighting 342, may be reduced. In the example shown in FIG. 3, the filter is an IR-transmitting polymer black matrix 344. Briefly, FIG. 4 illustrates an exemplary touch panel system 400 comprising an LCD 402. System 400 differs from system 300 of FIG. 3 in that the filter is comprised of two complementary color filters that are overlapping, for example, blue color filter 324 and red color filter 326. This implementation relies on the typical characteristics of visible light filters used in LCDs as outlined above.

Returning to FIG. 3, backlight 304 comprises an IR source, which in this example is an IR LED 346. IR LEDs are commercially available at a low cost at a range of wavelengths, including, for example, peak emission wavelengths around 900 nm: 850 nm, 860 nm, 870 nm, 880 nm, 890 nm, 935 nm, 940 nm and 950 nm. At some of these wavelengths, high power versions of the IR LEDs are available.

Infrared radiation from the IR source, indicated by an arrow 348, is transmitted through LCD 302 after being diffused by diffuser 312, if present. Some of the infrared radiation transmitted through LCD 304 is reflected off object 336 and detected by IR sensor 334 as described above.

Figure 5:
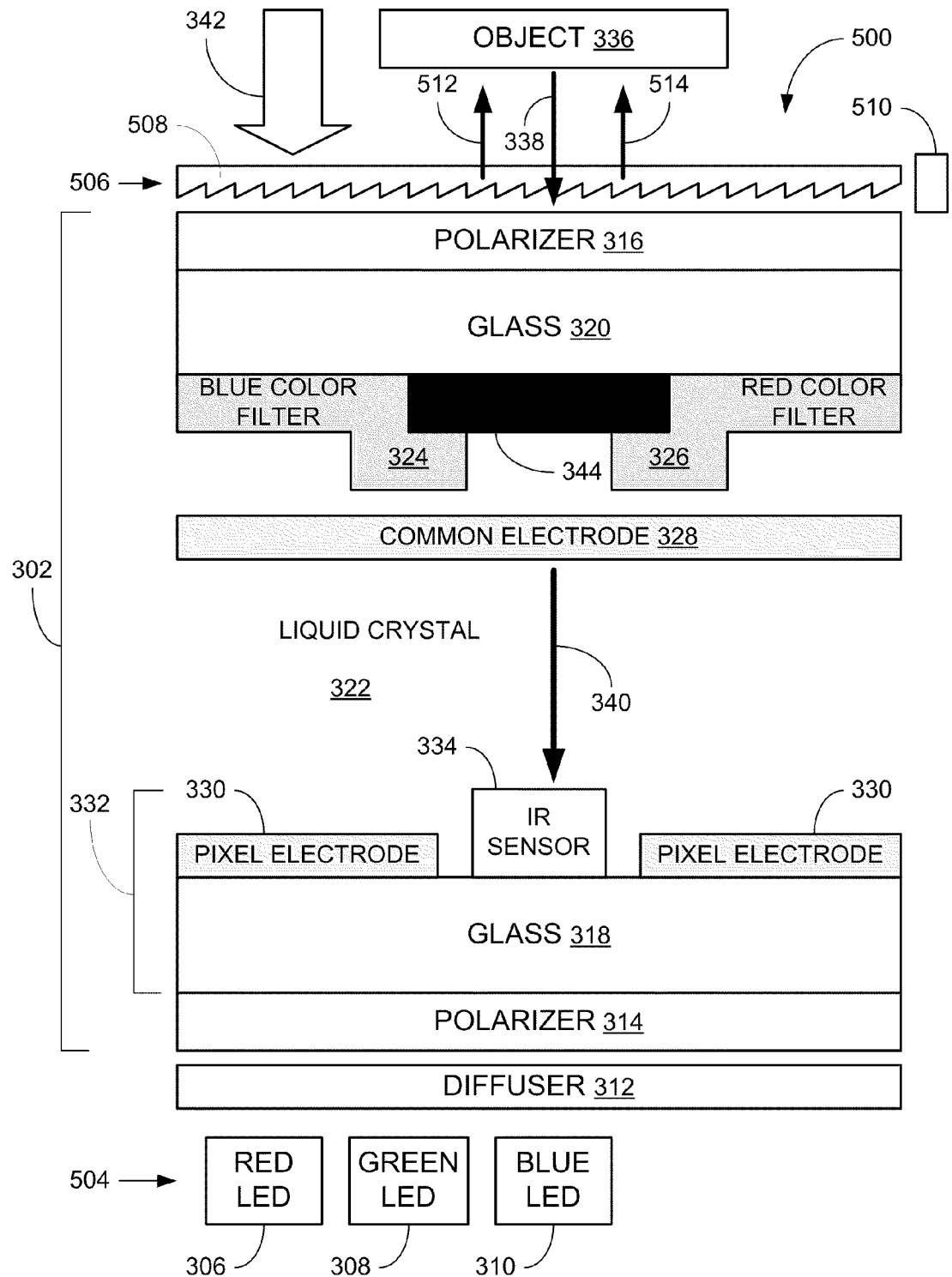
FIG. 5 illustrates a cross-section of an exemplary touch panel system having yet another exemplary liquid crystal display incorporated therein.

FIG. 5 illustrates a cross-section of an exemplary touch panel system having yet another exemplary liquid crystal display incorporated therein. A touch panel system 500 differs from system 300 of FIG. 3 in that its backlight 504 does not comprise an IR source. Rather, system 500 comprises an inverted frontlight 506 external to an outer surface of polarizer 316. Frontlight 506 comprises an infrared light guide 508 and an IR source coupled to light guide 508. In this example, the IR source is an IR LED 510 positioned to the side of light guide 508. Frontlight 506 is described as "inverted" because the IR radiation from the IR source is directed away from LCD 302, as indicated by arrows 512 and 514. Alternatively IR source may emit polarized IR radiation and polarization filters and/or reflectors blocking that polarization may be used between frontlight 506 and LCD 302. IR light reflected off object 336 is not polarized, will pass through the polarization filters and/or reflectors, and be detected by IR sensor 334. Although system 500 is shown comprising IR-transmitting polymer black matrix 344, in alternate embodiments the system may include a filter comprised of two complementary color filters that are overlapping, for example, blue color filter 324 and red color filter 326.

The touch panel systems illustrated in FIGS. 3, 4 and 5 comprise LCDs with active matrix backplanes. In other embodiments, the touch panel system could comprise an LCD with an active matrix frontplane, a passive matrix backplane or a passive matrix frontplane.

The touch panel systems illustrated in FIGS. 3, 4 and 5 comprise LCDs with an IR-transmitting and visible-light absorbing filter between the touchable surface of the system and the IR sensor. In other embodiments, the LCD may lack such a filter.

Figure 6:
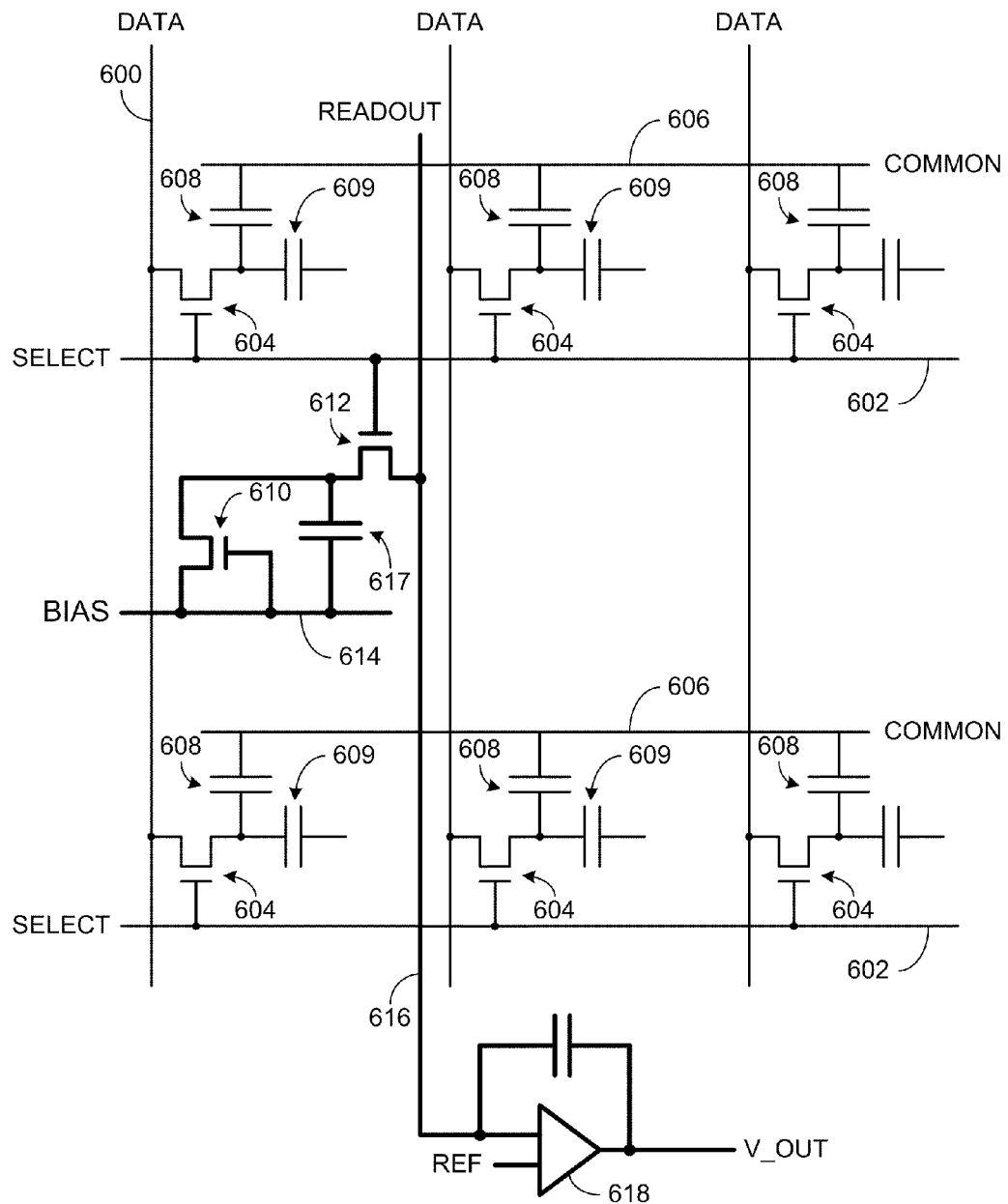
FIG. 6 illustrates an exemplary active matrix circuit having a TFT-based infrared sensor integrated therein.

FIG. 6 illustrates an active matrix circuit having a TFT-based infrared sensor integrated therein. As is known in the art, an active matrix layer comprises a set of data lines 600 and a set of select lines 602. An array of conductive lines may be created by including one data line for each column of pixels across the display and one select line for each row of pixels down the display. For each pixel, the active matrix layer also comprises a pixel TFT 604 capacitively coupled to a common line 606 through a capacitor 608. The source of pixel TFT 604 is coupled to its respective data line 600 and the drain of pixel TFT 604 is coupled to its respective select line 602. To load the data to the respective pixels indicating which pixels should be illuminated, normally in a row-by-row manner, a set of voltages are imposed on the respective data lines 600 which imposes a voltage on the sources of pixel TFTs 604. The selection of a respective select line 602, interconnected to the gates of pixels TFTs 604, permits the voltage imposed on the sources to be passed to drains of the pixel TFTs 604. The drains of the pixel TFTs are electrically connected to respective pixel electrodes. In addition, a respective capacitance exists between the pixel electrodes enclosing the liquid crystal material, noted as capacitances 609. Common line 606 provides a voltage reference. In other words, the voltage data (representative of the image to be displayed) is loaded into the data lines for a row of pixel TFTs 604 and imposing a voltage on select line 602 latches that data into the holding capacitors and hence the pixel electrodes.

To integrate an IR sensor into the liquid crystal circuit, the active matrix layer also comprises an infrared-sensitive TFT 610 interconnected to a readout TFT 612. The gate of readout TFT 612 may be interconnected to select line 602, and the drain and the gate of infrared-sensitive TFT 610 may be interconnected to a photobias line 614. (In other implementations, photobias line 614 and common line 606 may be one and the same.) The source of readout TFT 612 may be interconnected to a readout line 616. A capacitor 617 may interconnect photobias line 614 to the transistors. Readout line 616 is coupled to an operational amplifier 618 connected to a reference voltage. The TFTs may be addressed by a set of multiplexed electrodes running along the gaps between the pixel electrodes. Alternatively, the pixel electrodes may be on a different layer from the TFTs.

When a voltage is imposed on select line 602, this causes the voltage on readout line 616 to be coupled to the drain of infrared-sensitive TFT 610 and the drain of readout TFT 612, which results in a voltage potential across capacitor 617. The state of infrared-sensitive TFT 610 ("on" or "off") will depend on whether IR radiation is incident on infrared-sensitive TFT 610. For example, when a person touches the panel, the IR reflection off the finger (about 10%) will turn the infrared-sensitive TFT 610 partially "on". If infrared-sensitive TFT 610 is "off", the voltage imposed across capacitor 617 will not significantly discharge through infrared-sensitive TFT 610, and accordingly, the charge stored in capacitor 617 will be substantially unchanged. If infrared-sensitive TFT 610 is "on", the voltage imposed across capacitor 617 will significantly discharge through infrared-sensitive TFT 610, and accordingly, the charge stored in capacitor 617 will be substantially changed. To determine how much charge has leaked from capacitor 617, a voltage is imposed on select line 602. This turns on readout TFT 612 and a charge flows through readout line 616 to reset the charge on capacitor 617. The output voltage of operational amplifier 618 is proportional or otherwise associated with the charge needed to reset the voltage on capacitor 617 and is therefore a measure of the amount of IR radiation incident on infrared-sensitive TFT 610 during the preceding frame time. This output may be processed along with the output from other IR sensors in the circuit to identify a detected infrared image.

Infrared-sensitive TFT 610 and readout TFT 612, and the rest of the transistors in the active matrix layer, may comprise any suitable semiconductor material that is sensitive to infrared radiation, including polycrystalline silicon, monocrystalline silicon, microcrystalline silicon, nanocrystalline silicon, a plastic semiconductor material, and semiconductor materials that are not silicon-based.

For example, a microcrystalline silicon phototransistor can be manufactured with Plasma chemical vapor deposition (CVD) equipment on the same line as amorphous silicon TFTs. A large installed capacity is available for manufacturing a-Si TFT LCDs.

Figure 7:
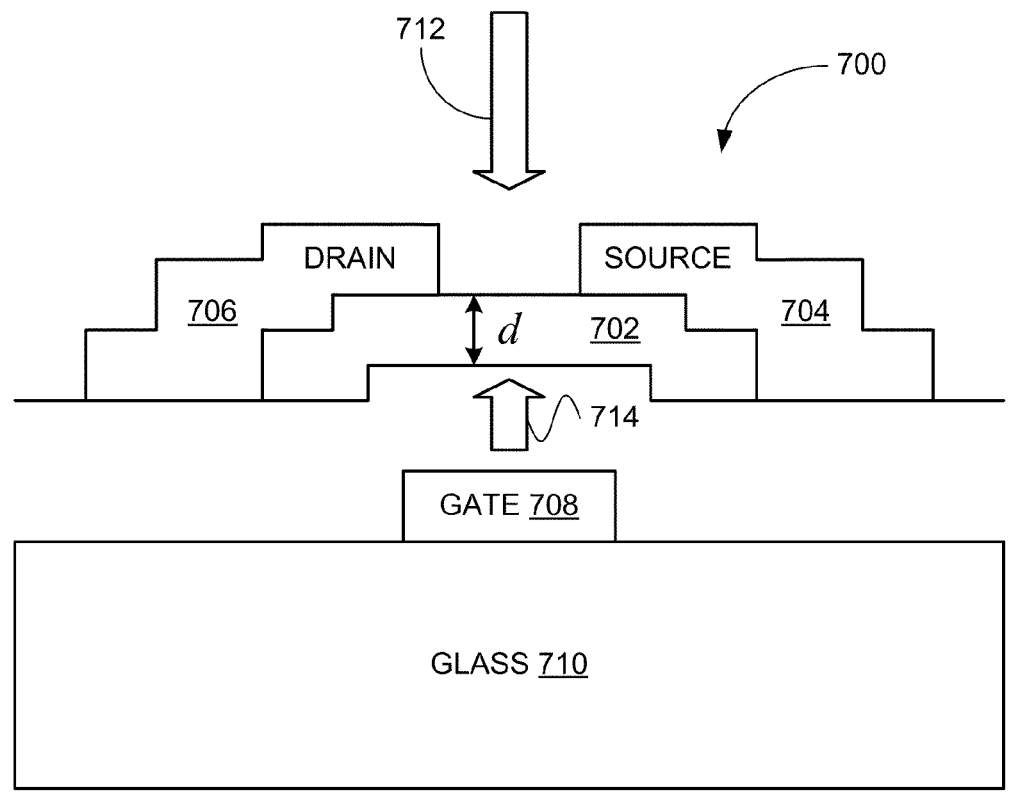
FIG. 7 is an example of a cross section of a bottom gate infrared-sensitive TFT.

FIG. 7 is an example of a cross section of a bottom gate infrared-sensitive TFT. A bottom gate infrared-sensitive TFT 700 comprises a film 702 of semiconductor material, having a thickness d, a source 704, and a drain 706. TFT 700 also comprises a gate 708, deposited on a substrate such as a glass substrate 710. Techniques for manufacturing TFT 700 are well known in the art. Some of infrared radiation 712 incident on semiconductor film 702 is absorbed by film 702. If gate 708 comprises a metal, for example, aluminum, that is reflective to infrared radiation, then at least some of infrared radiation 714 which is reflected from gate 708 is absorbed by film 702.

Ignoring optical interference, the absorption versus film thickness of a silicon-based TFT may be calculated using the following formula:

$$A = (1-R) \cdot (1 - \exp(-\alpha(\lambda) \cdot d)) \qquad (1)$$

where R is silicon film reflectance, $\alpha(\lambda)$ is the absorption coefficient, which is dependent on the wavelength $\lambda$, and d is the film thickness.

The absorption in percentage is calculated from this formula at $\lambda=0.82$ nm and $\lambda=0.94$ nm for microcrystalline silicon (μc-Si) films of 200 nm thickness and 300 nm thickness. For comparison, the calculated absorption is compared to that of amorphous silicon (a-Si) films of the same thicknesses. In these calculations, it was assumed that R=0. The results of these calculations are provided in the following table.

| Film Thickness | Absorption λ = 0.82 nm single-pass | Absorption λ = 0.94 nm single-pass |
|---|---|---|
| 200 nm a-Si | 0.04% | 0.01% |
| 300 nm a-Si | 0.06% | 0.02% |
| 200 nm μc - Si | 4.0% | 1.4% |
| 300 nm μc - Si | 5.8% | 2.1% |

It is apparent from this table that a photo TF with microcrystalline silicon will absorb about 100 times as much near IR radiation as an amorphous silicon TFT with the same silicon film thickness.

As mentioned above, the gate of a TFT-based IR sensor may comprise a metal, for example, aluminum, that is reflective to infrared radiation. This may increase the effective optical path length to up to twice the film thickness d, depending on how much of the IR radiation is reflected. The absorption in percentage is calculated from the formula above at λ=0.82 nm and λ=0.94 nm for microcrystalline silicon (μc-Si) films of 200 nm thickness and 300 nm thickness, for a double pass of the IR radiation. In these calculations, it was assumed that R=0 and that the reflection from the gate metal is 100%. The results of these calculations are provided in the following table.

| Film Thickness | Absorption λ = 0.82 nm double-pass | Absorption λ = 0.94 nm double-pass |
|---|---|---|
| 200 nm a-Si | 0.08% | 0.02% |
| 300 nm a-Si | 0.12% | 0.04% |
| 200 nm μc - Si | 7.7% | 2.8% |
| 300 nm μc - Si | 11.3% | 4.2% |

The doubling of the optical path significantly increases the total absorption in the file. If interference is taken into account, the film thickness may be further optimized to operate on an interference maximum for the absorption at the chosen wavelength. The photocurrent in the film is proportional to the absorption, assuming each absorbed photon contributes to the photocurrent.

Figure 8:
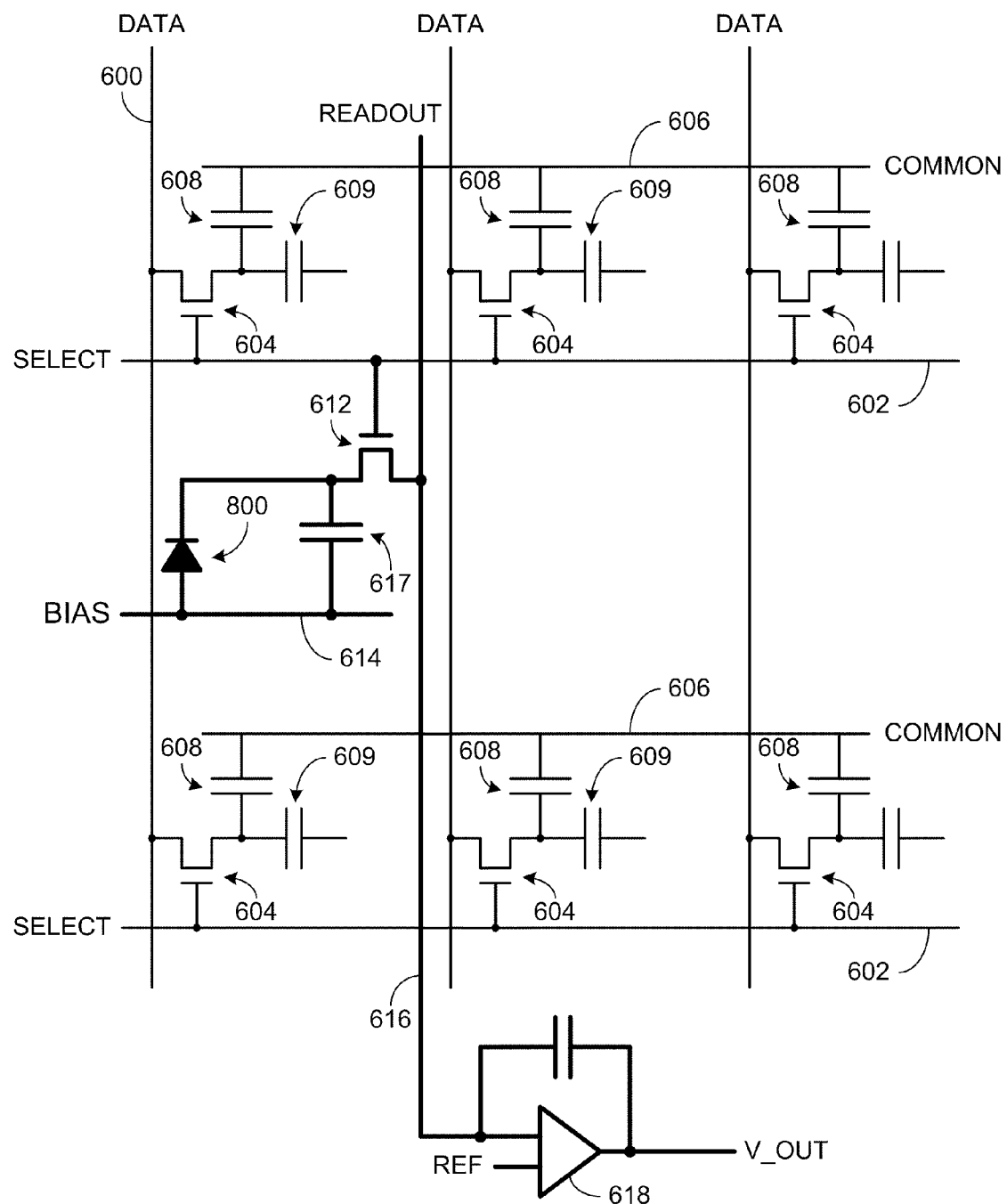
FIG. 8 illustrates an exemplary active matrix circuit having a photodiode-based infrared sensor integrated therein.

FIG. 8 illustrates an active matrix circuit having a photodiode-based infrared sensor integrated therein. The circuit of FIG. 8 differs from that of FIG. 6 in that an infrared-sensitive photodiode 800 replaces infrared-sensitive TFT 610. Photodiode 800 is interconnected to readout TFT 612. The anode of photodiode 800 may be interconnected to photobias line 614, and the cathode of photodiode 800 may be interconnected to the drain of readout TFT 612. For example, photodiode 800 may be a lateral PIN diode of polycrystalline silicon, and can be manufactured with a standard Low Temperature Poly Silicon Complementary Metal-Oxide Semiconductor (CMOS) process, which is common in the active matrix LCD industry.

Figure 9:
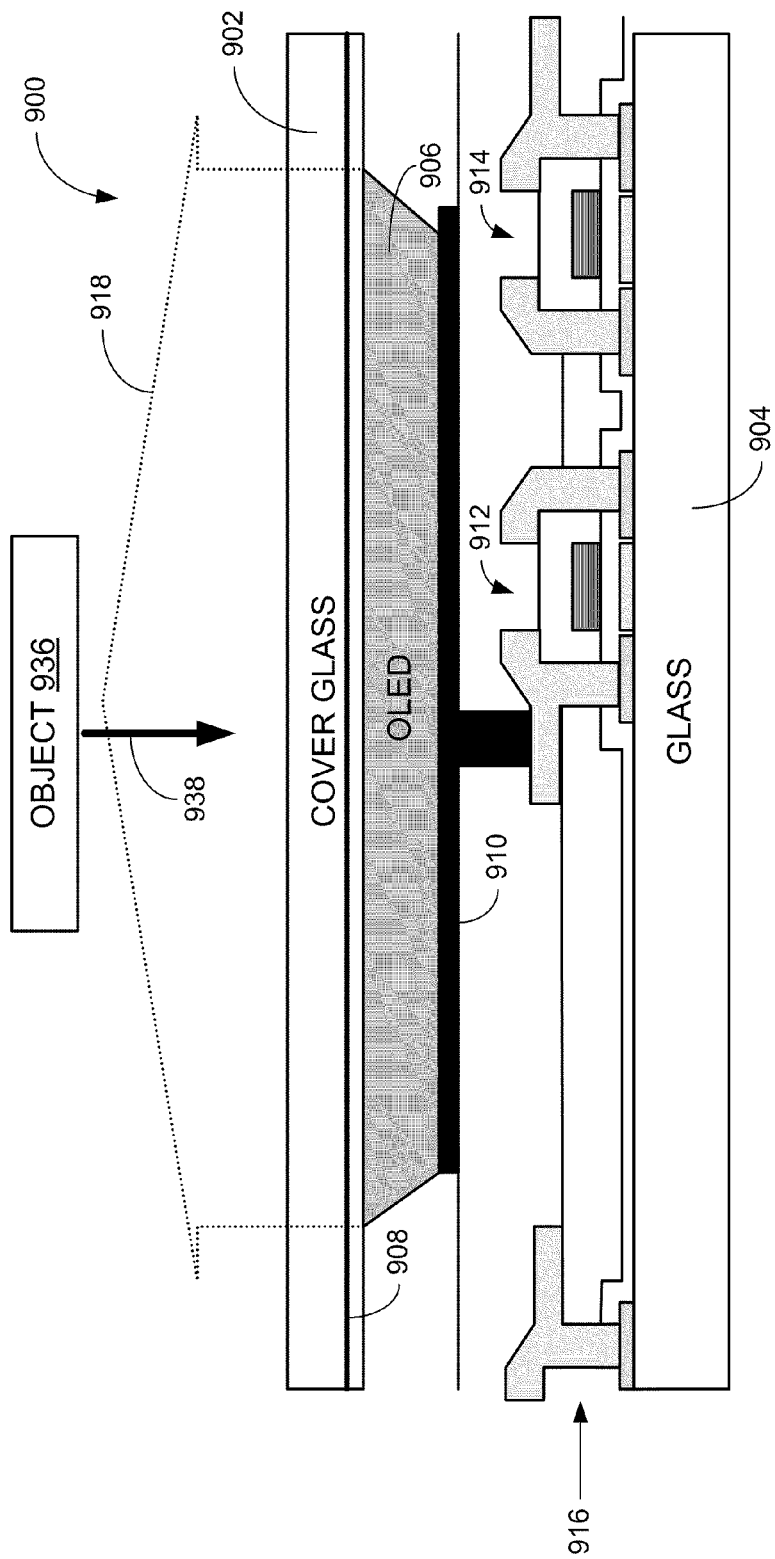
FIG. 9 illustrates a cross-section of an exemplary touch panel system having an organic light emitting diode display incorporated therein.

FIG. 9 illustrates a cross-section of an exemplary touch panel system 900 having an organic light emitting diode (OLED) display incorporated therein. Sandwiched between a cover glass 902 and a glass substrate 904 is an OLED 906. A translucent cathode 908 is embedded in cover glass 902, and a metal anode 910 couples OLED 906 to a drive TFT 912. Drive TFT 912 and an address TFT 914 are comprised in an active matrix backplane 916. Visible light radiating from OLED 906, indicated by an arrow 918, is directed outward through cover glass 902. IR sensors may be integrated into active matrix backplane 916, for example, as described below with respect to FIGS. 11 and 12. Alternatively, as described above with respect to FIG. 2C, OLED 906 may comprise IR-sensitive organic photosensors. A backlight (not shown) or a frontlight (not shown) may comprise IR sources (not shown). Alternatively, as described above with respect to FIG. 2C, OLED 906 may comprise IR OLED emitters. IR radiation from the IR sources may be incident on an object 936 above a touchable surface of touch panel system 900. IR radiation reflected from the object, as indicated by an arrow 938, may be detected by the IR sensors.

Figure 10:
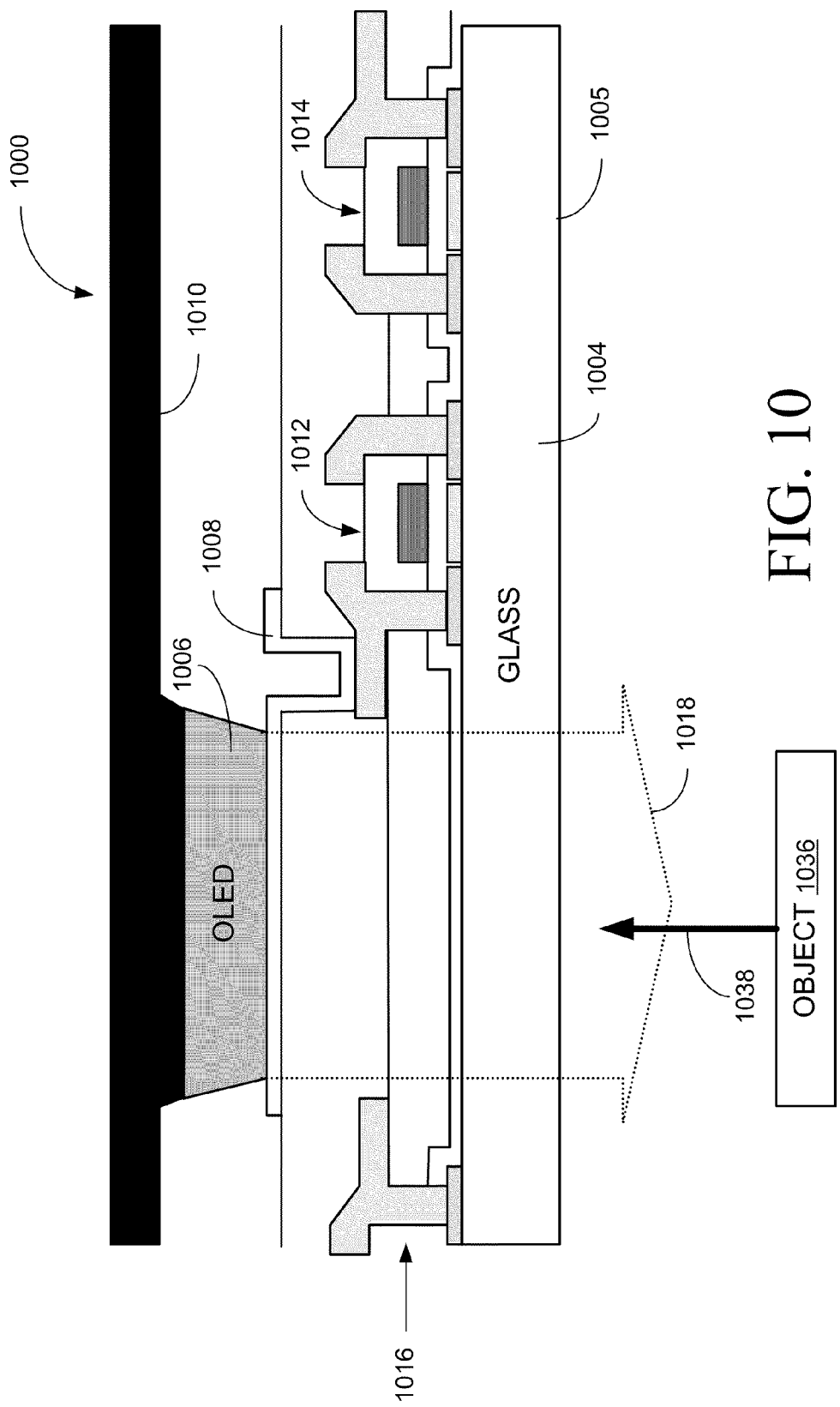
FIG. 10 illustrates a cross-section of another exemplary touch panel system having an organic light emitting diode display incorporated therein.

FIG. 10 illustrates a cross-section of another exemplary touch panel system 1000 having an OLED display incorporated therein. An OLED 1006 is sandwiched between a metal cathode 1010 and a transparent anode 1008. An active matrix layer 1016 comprises a drive TFT 1012 and an address TFT 1014. Drive TFT 1012 is coupled to transparent anode 1008. Visible light radiating from OLED 1006, indicated by an arrow 1018, is directed towards a glass substrate 1004. IR sensors may be integrated into active matrix backplane 1016, for example, as described below with respect to FIGS. 11 and 12. Alternatively, as described above with respect to FIG. 2C, OLED 906 may comprise IR-sensitive organic photosensors. A backlight (not shown) or a frontlight (not shown) may comprise IR sources (not shown). Alternatively, as described above with respect to FIG. 2C, OLED 1006 may comprise IR OLED emitters. IR radiation from the IR sources may be incident on an object 1036 above a touchable surface 1005 of touch panel system 1000. IR radiation reflected from the object, as indicated by an arrow 1038, may be detected by the IR sensors.

Figure 11:
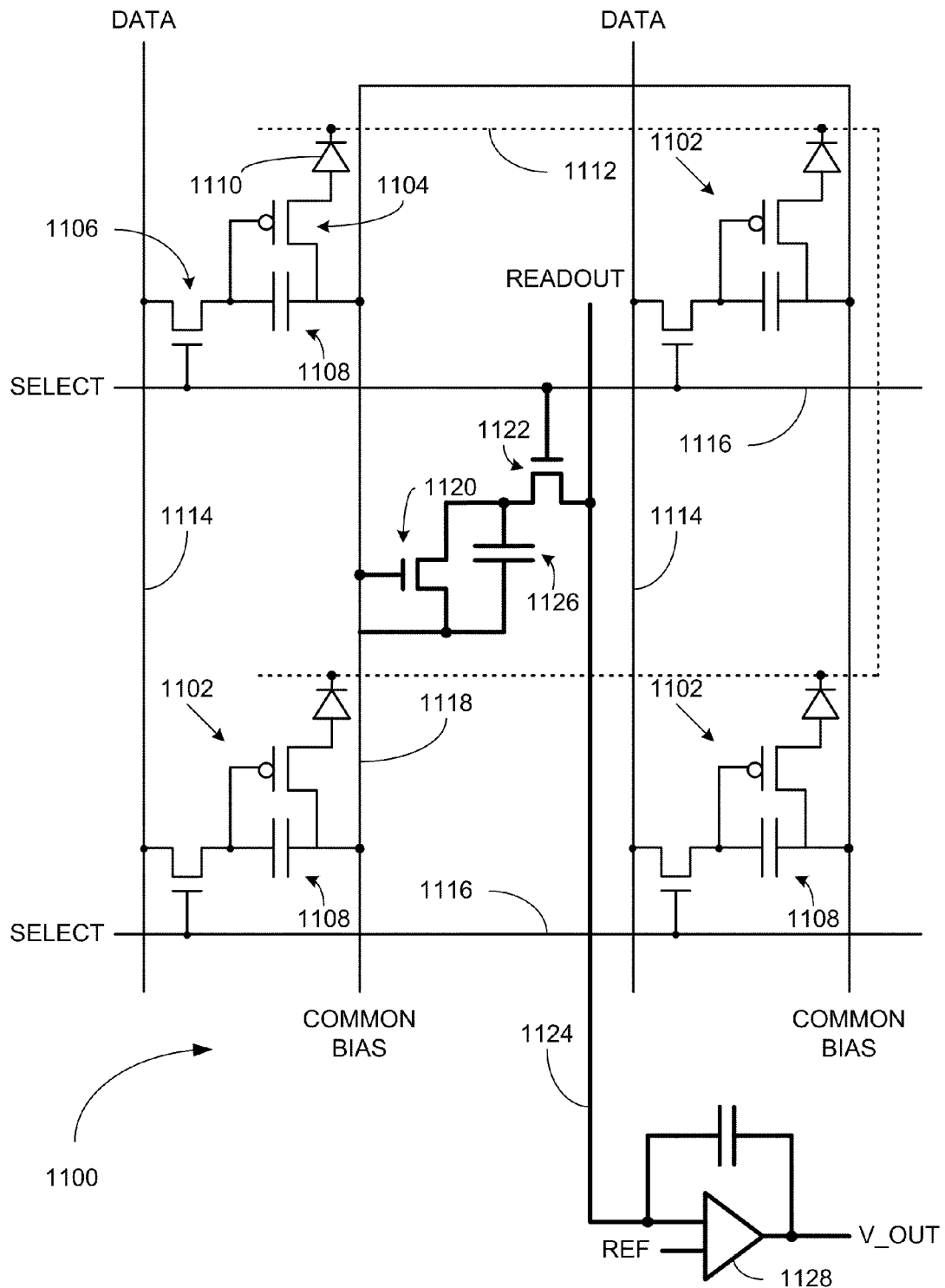
FIG. 11 illustrates an exemplary active matrix organic light emitting diode (OLED) circuit having a TFT-based infrared sensor integrated therein.

FIG. 11 illustrates an exemplary active matrix OLED circuit 1100 having a TFT-based infrared sensor integrated therein. Circuit 1100 comprises pixel circuits 1102 having two TFTs per pixel: a drive TFT 1104 and an access TFT 1106. Each pixel circuit 1102 also comprises a storage capacitor 1108 and an OLED 1110 coupled to a common OLED electrode 1112.

The active matrix layer comprises a set of data lines 1114 and a set of select lines 1116. The source of access TFT 1106 is coupled to its respective data line 1114 and the drain of access TFT 1106 is coupled to its respective select line 1116. Access TFT 1106 is capacitively coupled to a common bias line 1118 through storage capacitor 1108.

There are many other variations of pixel circuits having two or more TFTs per pixel.

To integrate an IR sensor into the active matrix OLED circuit, the active matrix layer also comprises an infrared-sensitive TFT 1120 interconnected to a readout TFT 1122. The gate of readout TFT 1122 may be interconnected to select line 1116, and the drain and the gate of infrared-sensitive TFT 1120 may be interconnected to common bias line 1118. The source of readout TFT 1122 may be interconnected to a readout line 1124. A capacitor 1126 may interconnect common bias line 1118 to the transistors. Readout line 1124 is coupled to an operational amplifier 1128 connected to a reference voltage. The TFTs may be addressed by a set of multiplexed electrodes running along the gaps between the pixel electrodes. Alternatively, the pixel electrodes may be on a different layer from the TFTs.

When a voltage is imposed on select line 1116, this causes the voltage on readout line 1124 to be coupled to the drain of infrared-sensitive TFT 1120 and the drain of readout TFT 1122, which results in a voltage potential across capacitor 1126. The state of infrared-sensitive TFT 1120 ("on" or "off")

will depend on whether IR radiation is incident on infrared-sensitive TFT 1120. For example, when a person touches the panel, the IR reflection off the finger (about 10%) will turn the infrared-sensitive TFT 1120 partially "on". If infrared-sensitive TFT 1120 is "off", the voltage imposed across capacitor 1126 will not significantly discharge through infrared-sensitive TFT 1120, and accordingly, the charge stored in capacitor 1126 will be substantially unchanged. If infrared-sensitive TFT 1120 is "on", the voltage imposed across capacitor 1126 will significantly discharge through infrared-sensitive TFT 1120, and accordingly, the charge stored in capacitor 1126 will be substantially changed. To determine how much charge has leaked from capacitor 1126, a voltage is imposed on select line 1116. This turns on readout TFT 1122 and a charge flows through readout line 1124 to reset the charge on capacitor 1126. The output voltage of operational amplifier 1128 is proportional or otherwise associated with the charge needed to reset the voltage on capacitor 1126 and is therefore a measure of the amount of IR radiation incident on infrared-sensitive TFT 1120 during the preceding frame time. This output may be processed along with the output from other IR sensors in the circuit to identify a detected infrared image.

Figure 12:
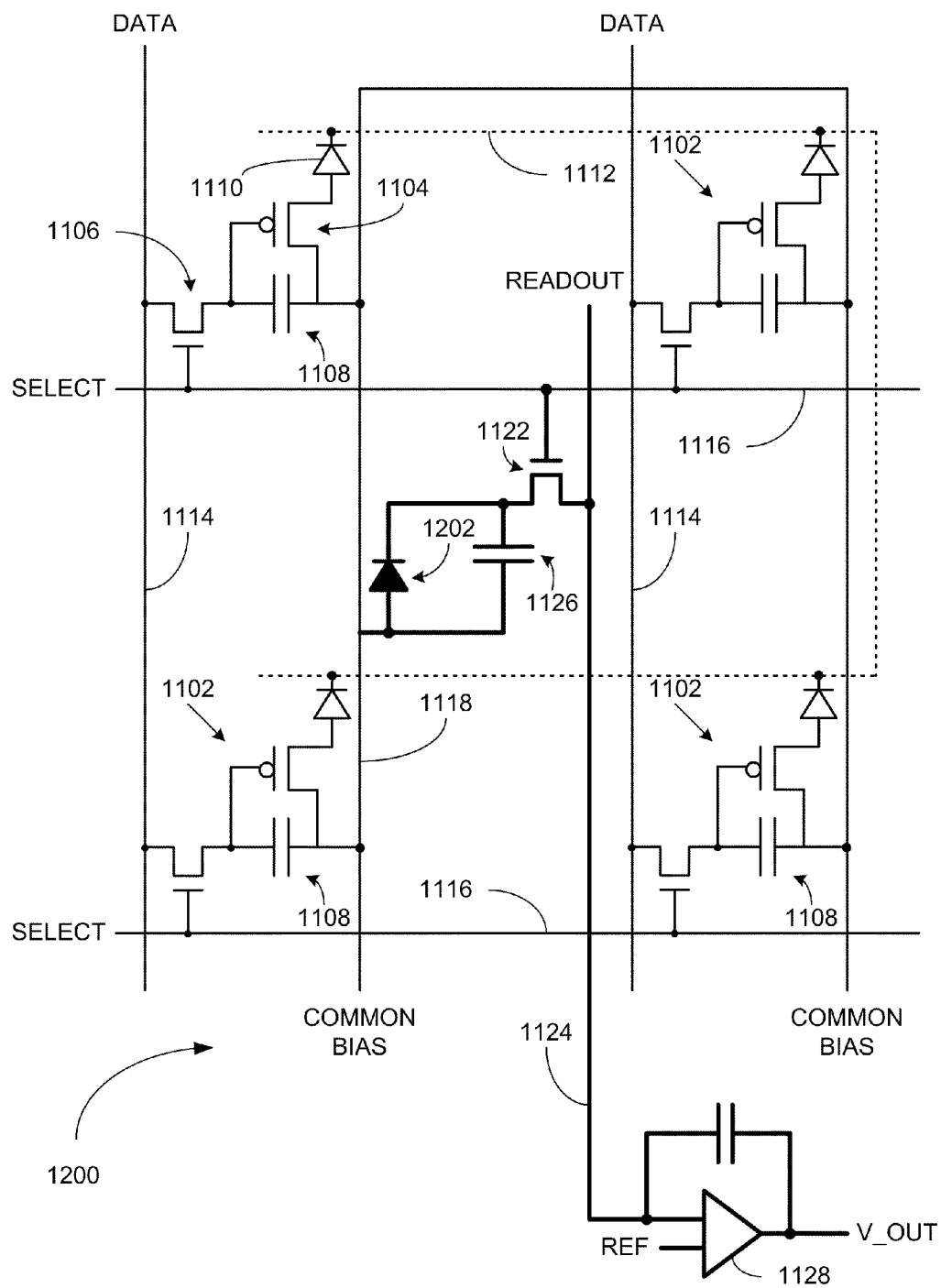
FIG. 12 illustrates an exemplary active matrix OLED circuit having a photodiode-based infrared sensor integrated therein.

FIG. 12 illustrates an exemplary active matrix OLED circuit 1200 having a photodiode-based infrared sensor integrated therein. Circuit 1200 differs from circuit 1100 in that an infrared-sensitive photodiode 1202 replaces infrared-sensitive TFT 1120.

The IR sensors in a touch panel system according to the described technology will also be sensitive to IR in the ambient radiation. Room light from incandescent lamps has a significant IR component. Likewise, in outdoor conditions, the solar spectrum at different times of the day includes IR radiation. It is known that the solar spectrum has a dip at about 920 nm. Therefore, IR sources emitting a peak wavelength at or near 920 nm may be used.

To improve signal-to-noise ratio in a touch panel system according to the described technology, the IR source may be pulsed in synchronization with the detection by the IR sensor. For example, for a sensor that integrates the signal during the frame time, the IR source(s) may be "on" during the odd frames and "off" during the even frames. This requires vertical scanning of the array of IR LEDs in the addressing direction of the rows. The differential signal between odd frames and even frames may cancel out the direct current (DC) noise from an IR background.

The signal-to-noise ratio may also be improved by increasing the intensity of the IR source.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A touch panel system comprising:
    a touchable surface;
    at least one infrared source integrated in the touch panel system and configured to direct infrared radiation through the touchable surface for illuminating one or more objects that are in contact with or adjacent to the touchable surface with infrared radiation; and
    a touch panel display configured to illuminate pixels for visibly displaying an image, the touch panel display comprising:
        a matrix circuit including pixel circuit elements;
        infrared sensors that are integrated in the matrix circuit with the circuit elements and distributed parallel to the touchable surface, wherein:
            the infrared sensors are configured to detect reflected infrared radiation incident on the infrared sensors,
            infrared radiation directed by the at least one infrared source through the touchable surface is not detected by the infrared sensors,
            reflected infrared radiation directed through the touchable surface by the one or more objects is detected by the infrared sensors,
            output from a plurality of the infrared sensors is processed to detect an infrared image, and
            detection of the infrared image based on the output of the plurality of infrared sensors does not conflict with the image visibly displayed on the touch panel display of the touch panel system; and
        infrared-transmitting and visible-light absorbing filters between the touchable surface and the infrared sensors, each infrared-transmitting and visible-light absorbing filter comprising overlapping complementary color filters, wherein the infrared-transmitting and visible-light absorbing filters shield the infrared sensors from visible light when detecting the reflected infrared radiation directed through the touchable surface by the one or more objects.

2. The touch panel system of claim 1, further comprising: a backlight arranged below the touch panel display, wherein the backlight comprises the at least one infrared source and at least one visible light source.

3. The touch panel system of claim 1, further comprising: a frontlight arranged above the touch panel, wherein the frontlight comprises the at least one infrared source, and the touchable surface comprises a surface of the frontlight.

4. The touch panel system of claim 1, wherein the touch panel display is a liquid crystal display.

5. The touch panel system of claim 4, wherein the matrix circuit is included in one of an active matrix backplane, an active matrix frontplane, a passive matrix backplane, and a passive matrix frontplane.

6. The touch panel system of claim 1, wherein the touch panel display is an organic light emitting diode display.

7. The touch panel system of claim 6, wherein the infrared source is an organic light emitting diode.

8. The touch panel system of claim 6, wherein the infrared sensors comprise organic photosensors.

9. The touch panel system of claim 1, wherein the infrared sensors comprise thin film transistors.

10. The touch panel system of claim 9, wherein at least one of the thin film transistors comprises:
    a film that absorbs reflected infrared radiation directed through the touchable surface by the one or more objects.

11. The touch panel system of claim 10, wherein the film comprises a semiconductor material selected from the group consisting of: mono-crystalline silicon, polycrystalline silicon, microcrystalline silicon, and nanocrystalline silicon.

12. The touch panel system of claim 10, wherein the film comprises a non-silicon-based semiconductor material.

13. The touch panel system of claim 1, wherein the infrared sensors comprise photodiodes.

14. The touch panel system of claim 1, wherein the overlapping complementary color filters comprise a red color filter overlapping a blue color filter.

15. The touch panel system of claim 1, wherein touch panel system is configured to:

identify locations of different objects that are in contact with the touchable surface, distinguish between the different objects by processing reflected infrared radiation which is directed through the touchable surface by the different objects and detected by the infrared sensors, and alter the image visibly displayed on the display of the touch panel system based on the locations of the different objects.

16. A touch panel display comprising:

a touchable surface;

a plurality of pixels for visibly displaying an image on the touchable surface;

a plurality of infrared sources configured to direct infrared radiation through the touchable surface for illuminating one or more objects that are in contact with or adjacent to the touchable surface with infrared radiation;

a backplane including pixel circuit elements;

infrared sensors that are integrated in the backplane with the pixel circuit elements and distributed parallel to the touchable surface, wherein:

output from a plurality of the infrared sensors is processed to detect an infrared image based on reflected infrared radiation incident on the infrared sensors, infrared radiation directed by the infrared sources through the touchable surface is not detected by the infrared sensors, and reflected infrared radiation directed through the touchable surface by the one or more objects is detected by the infrared sensors; and a plurality of infrared-transmitting and visible-light absorbing filters between the touchable surface and the infrared sensors, each infrared-transmitting and visible-light absorbing filter comprising overlapping complementary color filters, wherein the infrared-transmitting and visible-light absorbing filters shield the infrared sensors from visible light when detecting the reflected infrared radiation directed through the touchable surface by the one or more objects.

17. The touch panel display of claim 16, wherein the touch panel display is implemented by a liquid crystal display.

18. The touch panel display of claim 16, wherein the touch panel display is implemented by an organic light emitting diode display.

19. The touch panel display of claim 16, wherein the overlapping color filters comprise a red color filter overlapping a blue color filter.

20. A method performed in a touch panel system, the method comprising:

visibly displaying an image on a touchable surface of a touch panel display by illuminating pixels of the touch panel display;

directing infrared radiation from at least one infrared source integrated in the touch panel system through the touchable surface of the touch panel display for illuminating one or more objects that are in contact with or adjacent to the touchable surface with infrared radiation;

detecting reflected infrared radiation incident on infrared sensors which are integrated in the touch panel display with pixel circuit elements and distributed parallel to the touchable surface, wherein:

the infrared radiation directed by the at least one infrared source through the touchable surface is not detected by the infrared sensors, reflected infrared radiation directed through the touchable surface by the one or more objects is detected by the infrared sensors, and the touch panel display includes infrared-transmitting and visible-light absorbing filters between the touchable surface and the infrared sensors, each infrared-transmitting and visible-light absorbing filter comprising overlapping complementary color filters, wherein the infrared-transmitting and visible-light absorbing filters shield the infrared sensors from visible light when detecting the reflected infrared radiation directed through the touchable surface by the one or more objects; and processing output from a plurality of the infrared sensors to detect an infrared image, wherein detection of the infrared image based on the output of the plurality of infrared sensors does not conflict with the image visibly displayed on the touch panel display of the touch panel system.

21. The method of claim 20, further comprising:

identifying locations of different objects that are in contact with the touchable surface;

distinguishing between the objects by processing reflected infrared radiation which is directed through the touchable surface by the different objects and detected by the infrared sensors; and altering the image based on the locations of the different objects.

22. The method of claim 20, wherein the overlapping color filters comprise a red color filter overlapping a blue color filter.

* * * * *